United States Patent [19]

Hitt

[11] Patent Number: 5,077,902
[45] Date of Patent: Jan. 7, 1992

[54] POWER DRIVEN VIBRATING-WIRE SAW

[76] Inventor: James J. Hitt, 201 Skippack Pike, Broad Axe, Pa. 19002

[21] Appl. No.: 560,842

[22] Filed: Jul. 27, 1990

[51] Int. Cl.[5] .............................................. B23D 49/04
[52] U.S. Cl. .......................................... 30/394; 30/392
[58] Field of Search .................................. 30/392–394, 30/116, 117; 125/16.01, 16.03

[56] References Cited

U.S. PATENT DOCUMENTS 3,895,438 7/1975 Burkpile et al. .................. 30/393 X

FOREIGN PATENT DOCUMENTS 2558851 7/1977 Fed. Rep. of Germany ... 125/16.03
3415546 1/1985 Fed. Rep. of Germany ........ 30/392
7605590 2/1977 Netherlands ......................... 30/392

*Primary Examiner*—Douglas D. Watts
*Attorney, Agent, or Firm*—Rene A. Kuypers

[57] ABSTRACT

A non-binding wire saw having a back and forth cutting motion is disclosed. The saw is power driven and is found suitable for light duty such as tree trimming operations.

23 Claims, 2 Drawing Sheets

POWER DRIVEN VIBRATING-WIRE SAW

BACKGROUND OF THE INVENTION

The present invention relates in general to saw cutting equipment and, in particular, to a portable oscillating power saw.

At the present time the chain saw is the prevalent product in the marketplace for use in various cutting operations whether they be light or heavy duty. However, there is a need for cutting alternatives to the chain saw in view of its many deficiencies.

One of the glaring deficiencies of the present day chain saw is that it is dangerous to the user and operator since the chain saw has a long cutting exposure causing it to be one of the most dangerous hand tools presently in existence.

Another dangerous shortcoming of the chain saw is that due to its clockwise rotation there is a natural unilateral pull of the wood being cut towards the operator. This is hazardous to the operator since it brings the rotating saw in closer proximity to his/her limbs as well as general frontal area.

Also associated with modern day chain saws is a propensity for the rotating chain to periodically bind with the wood being cut such as a log or tree limb. When the cutting chain binds with the wood efforts must be expended to extricate the saw from the wood cut. This is not only inconvenient but additionally, it is time consuming and therefore unproductive.

Finally, the modern day chain saw is not deemed to be a satisfactory cutting tool since it requires maintenance in the form of frequent sharpening of the cutting edges of the rotating chain. This is a high cost maintenance charge particularly to operators who are subject to business downtime as well as the cost associated with the repair.

The present invention is designed to substantially improve upon the design of the prior art chain saw by substituting a rough reciprocating 360° cutting surface for the rotating cutting edges of the chain saw.

In view of the design of the present invention it is of light weight and hence is convenient for use by tree trimmers or similar personnel.

SUMMARY OF THE INVENTION

A wire cutting power saw is disclosed which is power driven but is nevertheless of light weight, and therefore eminently suitable for light tasks such as tree trimming.

The wire saw of the invention is designed in one embodiment with a bi-directional pulling action which is produced by an oscillating beam end. A stationary wire saw is stretched across the beam end such that when the beam oscillates with a back and forth motion the saw produces a 360° cutting action against the wood product. The beam end is driven and made to oscillate by a fly wheel pinion which is rotated by a light weight engine.

In another embodiment of the invention the saw developes a reciprocating action by a bi-directional movement of the cutting wire. The wire saw herein is driven in a bi-directional manner over a set of pulleys arranged over a loop configuration. The bi-directional motion of the saw is derived by a driven beam end which is attached to the cutting wire to force the oscillating motion over the pulley mechanism.

The wire cutting saw of the invention is significant to users in view of its relatively initial low cost, its ability to be easily replaced in the event of damage, and the lack of need for sharpening.

In all respects, the various embodiments disclosed herein are characterized by light weight and easy portability. The above characteristics are achieved by a simplified driving and wire cutting mechanism; in addition, the portable features of the oscillating saw are provided by hand openings provided in the saw frame.

It is therefore an object of this invention to present a novel oscillating wire saw.

It is a further object of this invention to offer a wire cutting reciprical power saw that is of light weight, simplified construction and ease of operation.

DESCRIPTION OF THE PREFERRED EMBODIMENTS

Figure 1:
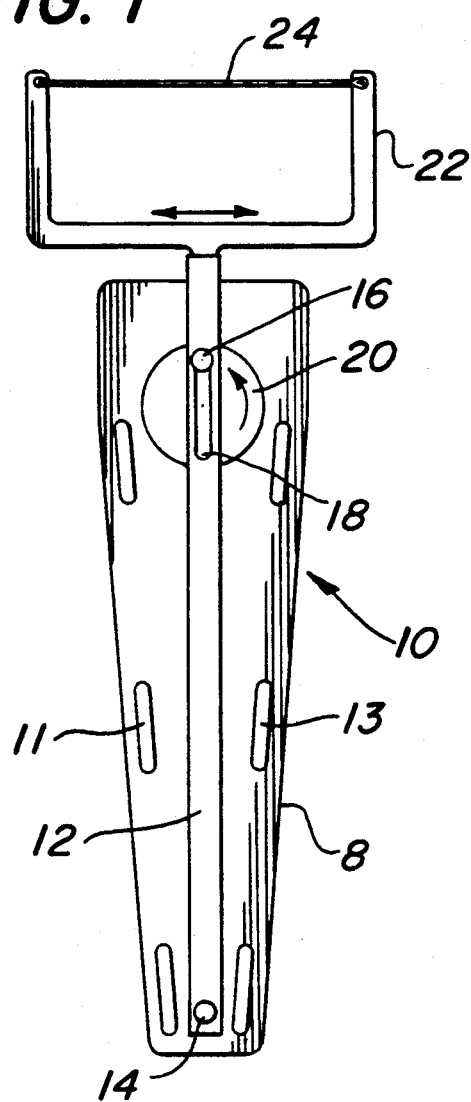
FIG. 1 is a front view of one embodiment of the cutting instrument of the invention utilizing an oscillating beam end to which a Y-shaped yoke and wire saw is connected.

Referring to the embodiment of FIG. 1 there is illustrated a vibrating power saw 10 with a Y-shaped yoke 22. Across the opening of the yoke is stretched a wire saw 24 having a 360° cutting surface. The yoke 22, when in the operative state, assumes an oscillating back and forward motion as indicated by the double arrows and enables a cutting action to occur when the vibrating saw 24 is placed against a wood surface.

The vibrating power saw 10 with the 360° cutting surface 24, as utilized throughout the various described embodiments, is a significant aspect of the invention in view of the quickness and ease with which it can be replaced across the yoke 22. Appropriate coupling devices (not shown), which are utilized in the art, are provided in the yoke 22 for facile coupling or de-coupling of the cutting saw 24.

The cutting saw 24 utilized with the vibrating yoke 22 of power saw 10 is also characterized by low initial and replacement cost as well as low maintenance cost, since no sharpening is necessary over its performing life. The wire saw 24 achieves its cutting action with a multiplicity of cutting edges of hardened carbide teeth embedded around its circumference. This structure of the saw 24 is such that it produces a non-binding cutting action since it does not have a non-cutting surface such as the present day chain saw or hand saw.

The oscillatory motion for producing the saw's cutting action originates from the frame 8 upon which is mounted an oscillating beam 12. The end of beam 12 is firmly attached to the Y-shaped yoke 22 by conventional connecting means as well as being joined to the pivot 14 and the drive pin 16. Drive pin 16 is located within a slot 18 and becomes slidable therein when the flywheel 20 is rotated by a primary mover such as a small horsepowered gas engine or electric motor.

The frame 8 of the cutting saw 10 includes a plurality of openings 11, 13 for grasping the unit with both hands while the wire saw 24 is firmly positioned against the wood cutting surface.

In operation, the cutting saw 10 is placed in operation by grasping the frame 8 via any of the openings 11, 13 and by activating the gas or electric powered primary mover (not shown) located upon the underside of the frame 10. As understood, the primary mover is connected to the flywheel 20 at its center. As the flywheel 20 rotates in a counter-clockwise direction as indicated by the arrow the drive pin 16 is made to rotate in the same direction within the slot 18. As the drive pin 16 rotates within slot 18 the drive beam 12 oscillates around pivot 14 in an arcuate manner in a leftward and then rightward direction from the initial position shown in the drawing.

The oscillating motion of the drive beam 12 causes a corresponding oscillatory motion of the Y-shaped yoke 22 and its cutting saw 24 against any wood object. As a result of the 360° cutting surface of the saw 24 in combination with its oscillatory motion, which produces an equal bidirectional pull, a non-binding cutting action is produced against a wood surface.

Figure 2:
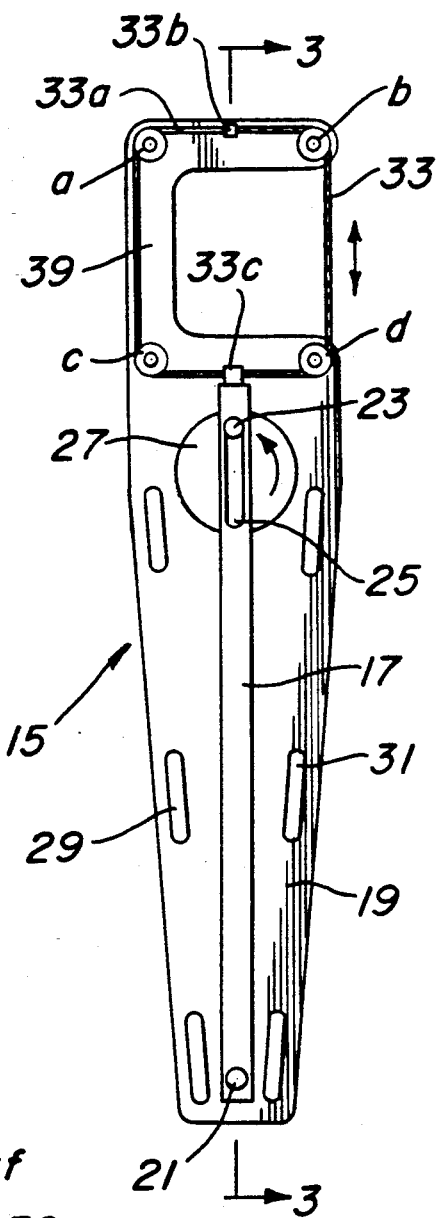
FIG. 2 is a front view of another embodiment of the cutting instrument of the invention utilizing an oscillating beam end to which a C-shape yoke and wire saw is joined through a pulley arrangement.

In FIG. 2 there is shown another wire power saw embodiment 15 of the invention, which is similar to the embodiment of FIG. 1 with respect to its drive mechanism, but differs insofar as its frame 19 has a terminus 39 which is C-shaped. At the various corners of the C-shaped terminus 39 is a respective pulley a, b, c, d around which the wire saw 33 is driven in an oscillatory manner as indicated by the arrows. The saw 33 is attached to a saw loop 33a which is attached at either end by state of the art attaching devices 33b, 33c.

One end of drive beam 17 is connected to the attaching device 33c and the other end to pivot 21. This enables the saw 33 to provide a cutting action when the drive pin 23 is slidably engaged within slot 25 due to rotation of flywheel 27.

Figure 3:
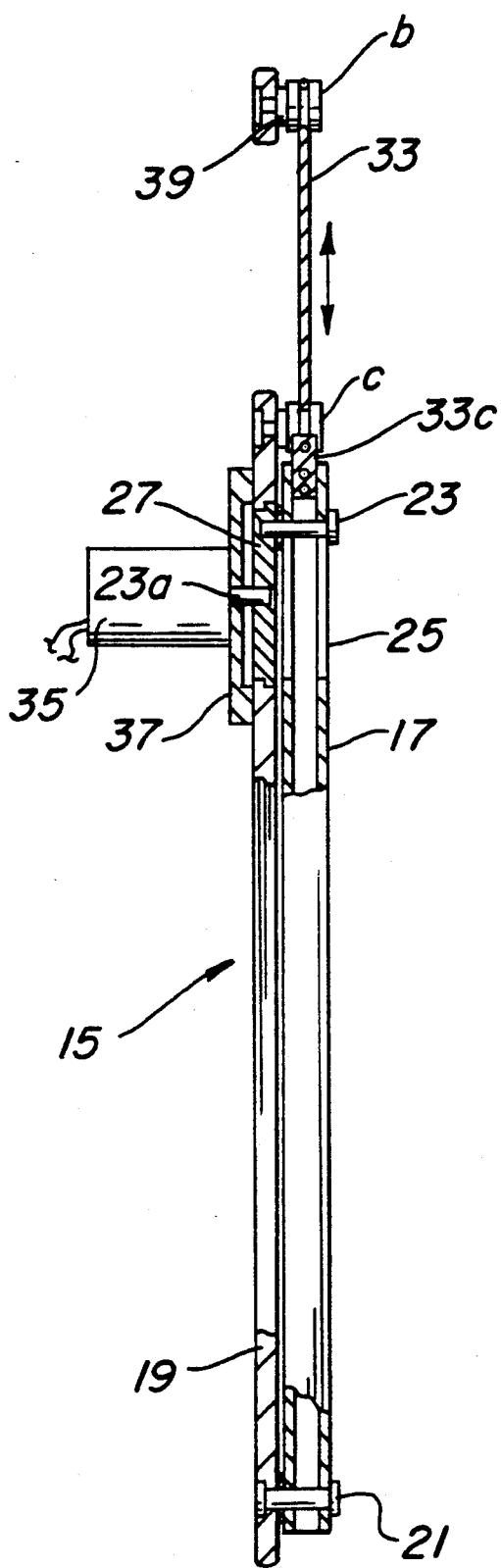
FIG. 3 is a sectional view of FIG. 2 taken on line 3—3.

The sectional view of FIG. 2 as seen in FIG. 3 illustrates the interaction of the various component parts together with the primary mover 35 which comprises a gasoline engine or electric motor. For purposes of discussion, the primary mover 35 is considered to be an electric motor having wires connected to some power source. The electric motor 35 is attached to the underside of the frame 19 through a mounting bracket 37.

A shaft member 23a which is rotated when the motor 35 is energized by the electric power source is couplied to the fly wheel 27 located within the frame 19. The flywheel 27 incorporates the pinion or drive pin 23 which slides in slot 25 located within drive beam 17 when the flywheel 27 is being rotated. As discussed previously, the rotation of the pinion 23 and flywheel 27 causes the drive beam 17 to oscillate in a bi-directional manner.

The drive beam 17 is shown connected at one end to the pivot 21 and at the other end to the cutting saw 33 via the attaching device 33c. Two of the pulleys b, c, which are connected to the C-shaped terminus 39, provide the drive members over which the cutting saw 33 is driven in the oscillatory manner as indicated by the up and down direction of the arrows.

Figure 4:
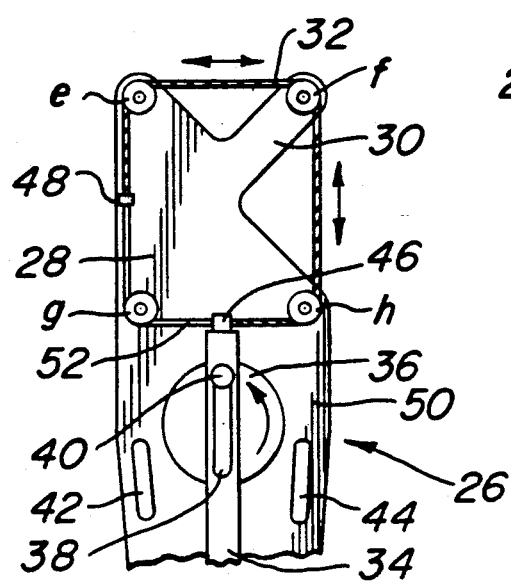
FIG. 4 is a partial front view of another embodiment of the invention whose terminus is triangularly configured with a projection extending therefrom for attachment of a wire saw through a pulley arrangement.

There is still another power cutting saw embodiment 26 of the invention shown in FIG. 4 where the terminus 28 of the saw frame 50 is triangular in shape with an off-set projection 30. Three pulleys e, g, h are located on the triangular terminus 28 and one pulley f is located on the projection to provide a four pulley drive for the cutting saw 32. The design of triangular terminus 28 and projection 30 provides the saw 32 with a horizontal cutting surface as indicated by the arrows, and a vertical cutting surface as also indicated by the arrows. This horizontal and vertical arrangement increases the versatility of the wire cutting saw 26.

With respect to other aspects of the cutting saw 26 of FIG. 4, it is identical to the operation of the embodiments of FIGS. 1 and 2 previously described. Accordingly, the frame 50 includes a drive beam 34 which is coupled to the flywheel 36 through the pinion 40 and slot 38. As understood, the flywheel is rotated by means of a primary mover which is not shown. The end of drive beam 34 is connected to saw 32 to provide the required oscillatory motion via the attaching device 46. The attaching device 46 is connected to the saw loop 52 which is in turn joined to the cutting saw 32 by way of the connector 48. The saw frame 50 also provides grip openings 42, 44 for grasping the saw 26 when placed in operation.

Figure 5:
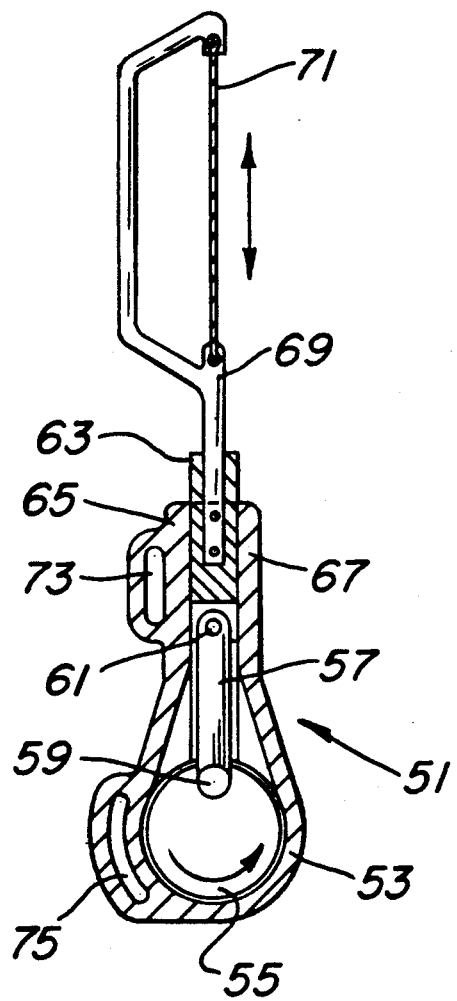
FIG. 5 is a sectional view of another embodiment of the invention which utilizes a piston driven motion for generating the reciprocal motion of the cutting saw.

In FIG. 5 another cutting saw embodiment 51 of the invention is disclosed. The cutting saw 51 achieves an equal bi-directional pulling action by being driven through the piston device 63. The piston 63, which is slidably engaged and guided within a cylinder or similar structure provided by piston walls 65, 67, is connected to the connecting link 57 and flywheel 55 via pivots 59, 61. The oscillatory motion generated by the piston 63 is produced by rotation of the flywheel 55 which is connected to a primary mover (not shown) such as a one-quarter or one-half horsepower two-cycle gas engine or similar type electric motor. The above discussed structural elements are maintained in a frame 53 which also includes grip openings 73, 75 for grasping the saw 51.

The bi-directional cutting action of the saw 71 as indicated by the arrows is developed by a C-shaped yoke 69 across which the saw 71 is positioned and held taut by well known fasteners (not shown).

In summary, several embodiments of the wire cutting power saw of the invention are disclosed and discussed in the above paragraphs. The saw is an alternative to the chain saw which is a dangerous tool to use especially in small job applications such as cutting of tree limbs. The chain saw is dangerous in view of the unilateral pull of wood being cut towards the operator which causes the saw to become precariously close to his/her body and limbs.

The wire power saw of the invention is designed to provide an equal bi-directional pull which is easy to keep against a wood surface. The equal pull is derived from an oscillatory motion of the connecting mechanism joined to the saw mechanism.

The saw used in the invention has a 360° cutting surface which may be made of stainless steel strands with embedded carbide teeth. As the saw is pulled bi-directionally the wire cuts into the wood by friction or abrasion. The wire cuts equally well in all directions making sticking less difficult and, therefore, less dangerous. The cutting is non-binding because there is no part to bind since there is no back support as in a chain saw or hand saw.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A portable wire saw for cutting in a forward and backward direction comprising:
   (a) a frame means;
   (b) a flywheel located within said frame means;
   (c) energizing means coupled to said flywheel for causing it to rotate;
   (d) a rigid means for locating said saw in a cutting position with respect to said frame means;
   (e) a longitudinal drive means which is coupled at one end to said flywheel and at its opposite end to said rigid means;
   (f) grasping means located upon said frame means for holding or alternatively, transporting said saw;
   (g) whereby when said energizing means is activated, said flywheel is made to rotate and said wire cutting saw provides a symmetrical cutting stroke in said forward and backward direction via said coupled drive means.

2. A wire saw in accordance with claim 1 wherein said grasping means further comprises at least one aperture for holding said saw.

3. A wire saw in accordance with claim 2 wherein said means for grasping comprises a plurality of slot means located in said frame.

4. A wire saw in accordance with claim 1 wherein said drive means is coupled to said flywheel through a drive pin.

5. A wire saw in accordance with claim 4 wherein said drive means further comprises a slot means for slidable engagement with said drive pin.

6. A wire saw in accordance with claim 1 wherein said rigid means comprises a yoke attached to said drive means and said cutting saw being positioned across said yoke.

7. A wire saw in accordance with claim 6 wherein said yoke is Y-shaped having fixed projections.

8. A wire saw in accordance with claim 7 wherein said rigid Y-shaped yoke moves in a substantially horizontal back and forth movement with respect to said frame means when said flywheel is activated.

9. A wire saw in accordance with claim 1 wherein said frame means is shaped at its terminus into a C-shape rigid.

10. A wire saw in accordance with claim 9 and further comprising a plurality of pulleys located around said C-shaped terminus, said cutting saw moving in a forward and backward direction by being coupled via said drive means around said pulleys.

11. A wire saw in accordance with claim 10 wherein said pulleys are four in number.

12. A wire saw in accordance with claim 10 wherein said drive means is coupled to said saw through a flexible means for cutting in a forward and backward direction when said flywheel is activated.

13. A wire saw in accordance with claim 12 wherein said forward and backward motion of said saw is oriented in substantially the same direction with respect to said drive means.

14. A wire saw in accordance with claim 1 wherein said frame means is shaped at its terminus into a triangular-like configuration including a projection extending from its apparent hypothenuse.

15. A wire saw in accordance with claim 14 and further comprising a plurality of pulleys located around said triangular like configuration and projection.

16. A wire saw in accordance with claim 15 wherein three pulleys are positioned upon said triangular like configuration and one pulley upon said projection.

17. A wire saw in accordance with claim 15 wherein said drive means is coupled to a wire saw for achieving a forward and backward motion around said pulleys when said flywheel is activated.

18. A wire saw in accordance with claim 1 wherein said drive means and wire saw move in unison with each other through a reciprocating movement when said flywheel is activated.

19. A wire saw in accordance with claim 18 wherein said frame means includes at least first and second grasping means.

20. A wire saw in accordance with claim 18 wherein said drive means comprises a reciprocating slide means located within a guide means which is coupled to said flywheel for causing said saw to move in a forward and backward direction when activated by said energized means.

21. A symmetrical wire saw for cutting soft, or alternatively hard substances comprising:
   (a) a frame means;
   (b) a flywheel located within such frame means;
   (c) energizing means coupled to such flywheel for causing it to rotate;
   (d) a guide means located within such frame means;
   (e) a rigid means for locating said saw;
   (f) slidable means located within said guide means and being coupled to said rigid means;
   (g) means for attaching said flywheel and slidable means,
   (h) whereby when said energizing means is activated said flywheel is made to rotate and, said coupled rigid means initiates a symmetrical forward and backward cutting action of said saw against said substances via a reciprocating action of said slidable means.

22. A wire saw in accordance with claim 21 and further including a C-shaped rigid means across which said saw is positioned and held taut.

23. A wire saw in accordance with claim 21 and further including first and second openings located in said frame means for grasping said saw during said cutting action.

* * * * *